(12) United States Patent
Ke

(10) Patent No.: US 12,603,516 B1
(45) Date of Patent: Apr. 14, 2026

(54) CHARGING EQUIPMENT WITH CHARGING BRACKET AND ELECTRONIC DEVICE ASSEMBLY WITH CHARGING BRACKET

(71) Applicant: Shenzhen Xianyang Innovation Technology Co., Ltd, Shenzhen (CN)

(72) Inventor: Huiyi Ke, Shenzhen (CN)

(73) Assignee: Shenzhen Xianyang Innovation Technology Co., Ltd, Shenzhen (CN)

( * ) Notice: Subject to any disclaimer, the term of this patent is extended or adjusted under 35 U.S.C. 154(b) by 0 days.

(21) Appl. No.: 19/320,236

(22) Filed: Sep. 5, 2025

(51) Int. Cl.
*H02J 7/70* (2026.01)
*H02J 50/10* (2016.01)

(52) U.S. Cl.
CPC .............. *H02J 7/731* (2026.01); *H02J 50/10* (2016.02)

(58) Field of Classification Search
CPC ................................ H02J 7/0044; H02J 7/731
USPC ......................................................... 320/108
See application file for complete search history.

(56) References Cited

U.S. PATENT DOCUMENTS

| | | | | |
|---|---|---|---|---|
| 6,284,407 | B1 * | 9/2001 | Murray | H04M 1/0262 |
| | | | | 429/96 |
| 8,891,800 | B1 * | 11/2014 | Shaffer | H04R 1/1025 |
| | | | | 381/384 |
| 10,110,048 | B2 * | 10/2018 | Loewen | H02J 50/80 |
| 12,088,112 | B1 * | 9/2024 | Yi | H02J 50/402 |
| 12,467,580 | B1 * | 11/2025 | Zhi | F16M 11/10 |
| 12,537,390 | B2 * | 1/2026 | Kim | H02J 50/005 |
| 2012/0194979 | A1 * | 8/2012 | Hsieh | H04M 1/04 |
| | | | | 361/679.01 |
| 2013/0241470 | A1 * | 9/2013 | Kim | H04M 1/04 |
| | | | | 320/107 |
| 2016/0246333 | A1 * | 8/2016 | Mehandjiysky | G06F 1/1681 |
| 2022/0082200 | A1 * | 3/2022 | Gupta | H01F 7/02 |
| 2022/0094382 | A1 * | 3/2022 | Cole | H04B 1/3888 |
| 2023/0146663 | A1 * | 5/2023 | Zhao | H02J 7/0042 |
| | | | | 320/107 |
| 2024/0308436 | A1 * | 9/2024 | Yao | F16M 11/041 |
| 2025/0088015 | A1 * | 3/2025 | Zheng | H02J 50/10 |
| 2025/0373078 | A1 * | 12/2025 | Yang | G06F 1/1632 |
| 2025/0384420 | A1 * | 12/2025 | Sanchez De la Rosa | |
| | | | | G06Q 20/206 |
| 2025/0385547 | A1 * | 12/2025 | Song | H02J 7/731 |

FOREIGN PATENT DOCUMENTS

CN 222996258 U * 6/2025

* cited by examiner

*Primary Examiner* — Jerry D Robbins
(74) *Attorney, Agent, or Firm* — Law Offices of Sandy Lipkin; Sandy Lipkin

(57) ABSTRACT

A charging equipment includes a charging bracket and a mobile power source. The charging bracket includes a base and a first supporting portion, and a first magnetic attraction member and a first charging plug are arranged on the first supporting portion. A second magnetic attraction member and a second charging plug are arranged on the mobile power source. The mobile power source is detachably connected to the charging base through a mutual magnetic attraction between the second magnetic attraction member and the first magnetic attraction member. The second charging plug is configured for being electrically connected to the first charging plug, so that the mobile power source is charged.

16 Claims, 14 Drawing Sheets

CHARGING EQUIPMENT WITH CHARGING BRACKET AND ELECTRONIC DEVICE ASSEMBLY WITH CHARGING BRACKET

CROSS-REFERENCE TO RELATED APPLICATIONS

The application claims priority of Chinese patent application CN202521825879.3, filed on Aug. 26, 2025, which is incorporated herein by reference in its entirety.

TECHNICAL FIELD

The present invention relates to the field of electronic product, in particular to a charging equipment.

BACKGROUND ART

With the continuous development and popularization of the electronic device, the quantity of electronic device is continuously increasing. Therefore, as one of the peripheral products of the electronic device, charging equipment is gaining more and more attention.

The present technology provides a wireless charging device. The wireless charging device includes a charging bracket. The charging bracket includes a supporting housing and a placement housing. A placement slot is defined in the placement housing. A mobile power source is capable of being placed in or being separated from the placement housing via the placement slot. An electrical contact chip is arranged on a bottom end of the mobile power source, and an electric probe is arranged on a bottom end of the placement slot. When the mobile power source is placed in the placement slot, the electric probe is electrically connected to the electrical contact chip, so that the mobile power source is charged. This design enables the mobile power source to automatically charge without additional operation when placed in the charging bracket.

However, in this solution, the mobile power source can only be positioned and fixed by the placement slot, and the mobile power source can only be made to charge after being aligned with and placed into the placement slot. During use, the placement slot is not only easy to scratch the mobile power source, but also likely to cause the electric probe unable to contact the mobile power source, thereby resulting in the failure of charging.

SUMMARY

The main purpose of the present invention is to provide a charging equipment, aiming to improve the reliability of charging of the mobile power source through the charging bracket.

To achieve the above-mentioned purpose, a charging equipment provided by the present invention includes a charging bracket.

The charging bracket includes a base and a first supporting portion, and a first magnetic attraction member and a first charging plug are arranged on the first supporting portion.

The charging equipment further includes a mobile power source. A second magnetic attraction member and a second charging plug are arranged on the mobile power source. The mobile power source is detachably connected to the charging base through a mutual magnetic attraction between the first magnetic attraction member and the second magnetic attraction member. The second charging plug is configured for being electrically connected to the first charging plug, so that the mobile power source is charged.

The present invention further provides an electronic device assembly, the electronic device assembly includes an electronic device and the charging equipment mentioned above. The electronic device includes a induction coil and a battery. The first wireless charging module and the induction coil are in cooperation with each other to charge the battery.

The technical solution of the present invention realizes a convenient connection between the mobile power source and the charging bracket by using a magnetic attraction structure. When the first magnetic attraction member of the first supporting portion and the second magnetic attraction member of the mobile power source are approaching, a magnetic force is generated. This guides the first magnetic attraction member and the second magnetic attraction member to automatically attract and positioning. There is no need to precisely align the specific slot in this process. Thus, the friction damage risk caused by traditional placement slot structure is eliminated. In this way, the probability of poor contact due to misalignment is significantly reduced. Moreover, the charging reliability and the service life of the equipment are greatly improved.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
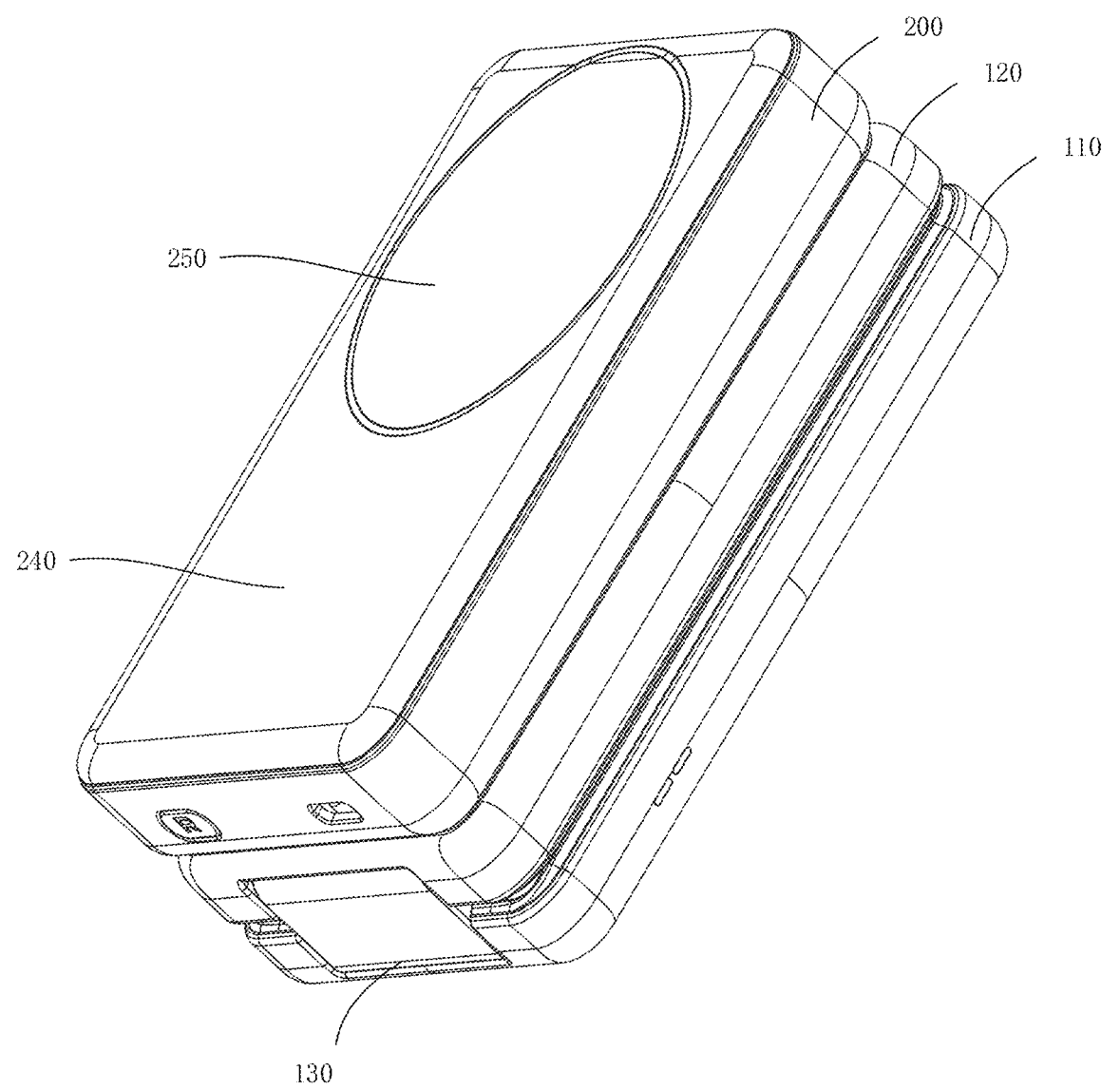
FIG. 1 is a structure diagram of an embodiment of the charging equipment provided by the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

In the traditional design of a charging bracket 100, a mobile power source 200 is required to precisely engaged in a physical placement slot, so as to achieve an alignment connection between an electric probe and an electrical contact chip. This mechanical positioning mode has obvious limitation. To frequently plug and unplug will easily lead to equipment surface abrasion, and small dislocation will lead to poor contact, resulting in charging interruption.

Therefore, the present invention provides a charging equipment.

Figure 2:
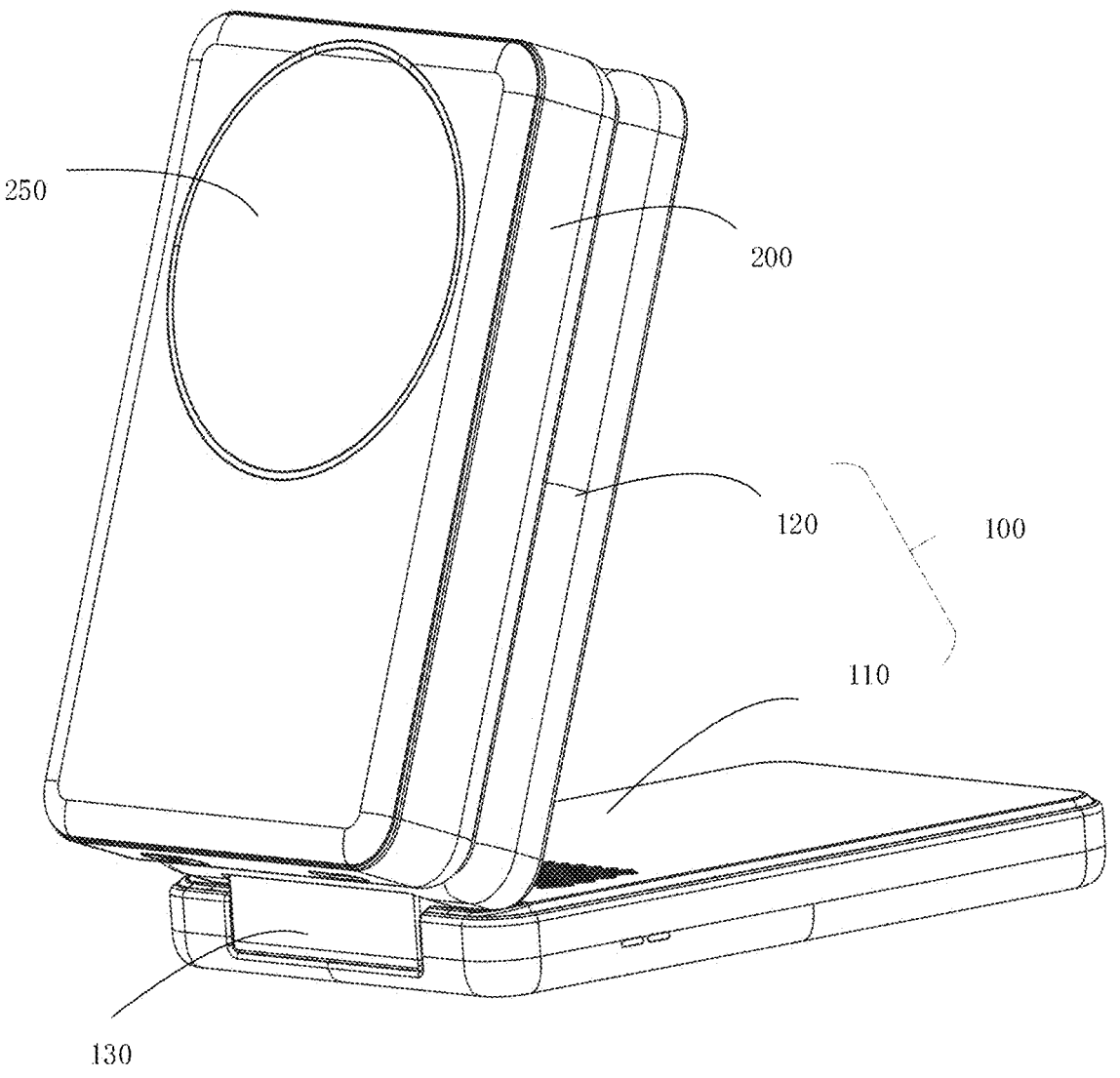
FIG. 2 is a structure diagram of another embodiment of the charging equipment provided by the present invention.

Referring to FIG. 1 and FIG. 2, according to an embodiment of the present invention, the charging equipment includes a charging bracket 100.

The charging bracket 100 includes a base 110 and a first supporting portion 120. A first magnetic attraction member 121 and a first charging plug 122 are arranged on the first supporting portion 120.

The charging equipment further includes a mobile power source 200. The mobile power source 200 is provided with a second magnetic attraction member 210 and a second charging plug 220. The mobile power source 200 is detachably connected to the charging base 110 through a mutual magnetic attraction between the second magnetic attraction member 210 and the first magnetic attraction member 121. The second charging plug 220 is configured for being electrically connected to the first charging plug 122, so that the mobile power source 200 is charged.

The technical solution of the present invention realizes a convenient connection between the mobile power source 200 and the charging bracket 100 by using a magnetic attraction structure. When the first magnetic attraction member 121 of the first supporting portion 120 and the second magnetic attraction member 210 of the mobile power source 200 are approaching, a magnetic force is generated. This guides the first magnetic attraction member 121 and the second magnetic attraction member 210 to automatically attract and positioning. After the magnetic attraction members are attracted to each other, the first charging plug 122 and the second charging plug 220 arranged in corresponding positions naturally together form physical contact and establish an electrical connection path. This process eliminates the need for precise alignment in a particular slot. Users only need to bring the mobile power source 200 close to the charging bracket 100, so that the mobile power source 200 is automatically guided to a correct position by the magnetic force. Under an attraction state, the magnetic attraction members provide stable holding force to ensure continuous contact and conduction of the charging plug. In this way, friction damage risk caused by the traditional placement slot structure is avoided, and the probability of poor contact caused by misalignment is also greatly reduced. Thus, the charging reliability and the service life of the equipment is improved significantly. At the same time, the magnetic attraction connection mode simplifies users' operation steps. Moreover, positioning and power-on can be completed only by a single adsorption, so as to realize an immediate charging as soon as the mobile power source is placed.

In the prior art, most charging brackets 100 often only have a single charging function, either only charging the mobile power source 200, or only providing charging support for other electrical equipment. If users need to supplement electricity for a plurality of equipment at the same time, it is often necessary to configure a plurality of charging devices. This not only occupies space, but also requires complex operation. In addition, some equipment integrated with multiple charging functions have problems such as unreliable connection and complex operation, which affects user experience.

Based on the problems mentioned above, it is aimed to realize convenient charging for other electrical equipment at the same time of ensuring the charging reliability of the mobile power source 200. Referring to FIG. 1 to FIG. 9, in the embodiment, a first wireless charging module 123 is further arranged on the first supporting portion 120. The first wireless charging module 123 is configured for charging electrical equipment.

A first battery module is arranged on the base 110. The first battery module is electrically connected with the first wireless charging module. The first battery module is electrically connected with the first charging plug, and the first battery module is configured for charging.

In this embodiment, the first wireless charging module 123 is further arranged on the first supporting portion 120 of the charging equipment. This first wireless charging module 123 is capable of directly providing electricity support for the electrical equipment with a wireless charging function, such as smartphone and smart watch. The first battery module is arranged in the base 110. The first battery module, the first wireless charging module 123 and the first charging plug 122 together form an electrical path through circuit connection, so as to stably supply power for the first wireless charging module 123 and the first charging plug 122. When the mobile power source 200 is attracted and connected to the first magnetic attraction member 121 of the first supporting portion 120 via the second magnetic attraction member 210, the first charging plug 122 and the second charging plug 220 are naturally connected and conducted. Thus, the electricity in the first battery module is configured for flowing towards the mobile power source 200 through the electrical path, so as to achieve a wired charging for the mobile power source 200. Meanwhile, the first wireless charging module 123 is configured to start and work under the electricity supply from the first battery module. Moreover, by using the principle of electromagnetic induction, an alternating magnetic field is generated and coupled with the induction coil in the electrical equipment, so as to transmit the electric energy to the electrical equipment in a wireless way and complete non-contact charging.

In the whole process, users do not need to make complex operations, and only need to place the mobile power source 200 close to the charging bracket 100, so as to make the mobile power source 200 accurately placed and connected through the magnetic attraction. After that, place other electrical equipment in a specific area corresponding to the first wireless charging module 123 of the first supporting portion 120, so as to realize simultaneous charging of the mobile power source 200 and other equipment.

In the prior art, the supporting structure of the charging bracket 100 is mostly a fixed form, and the angle can not be adjusted according to actual use demand. This makes users often feel inconvenient because of an inappropriate angle, when using the bracket to place the equipment or observe the equipment screen.

Referring to FIG. 1 to FIG. 9, in the embodiment, the charging bracket 100 further includes a first rotating shaft assembly 130.

The first rotating shaft assembly 130 is detachably connected to the base 110. A first end of the first supporting portion 120 is rotatably connected to the first rotating shaft assembly 130, and a second end of the first supporting portion 120 is a free end.

The first end of the first supporting portion 120 realizes a rotational connection with the first rotating shaft assembly 130, and the second end of the first supporting portion 120 serves as the free end. This structural design enables the first supporting portion 120 to rotate with the first rotating shaft assembly 130 as a fulcrum. Thus, the users can flexibly adjust an inclination of the first supporting portion 120 according to the users' needs, such as the angle of viewing the equipment screen, the convenience of placing the equipment, etc. When the angle is required to be adjusted, simply apply a suitable force to push or pull the free end of the first supporting portion 120, and then the first supporting portion 120 will rotate around the first rotating shaft assembly 130 until a desired angle is reached. The adjustability of the angle of the first supporting portion 120 greatly improves the flexibility of the equipment. The users can easily adjust the first supporting portion 120 to an appropriate angle according to different scenes. Moreover, it is more convenient to place the equipment for charging or to watch a video through the bracket.

In the using scene of electronic equipment, users have various demands on support and charging functions of wearable devices such as watches and bracelets. The traditional bracket has single function and fixed angle. Thus, it is difficult to adapt to different using states.

Figure 3:
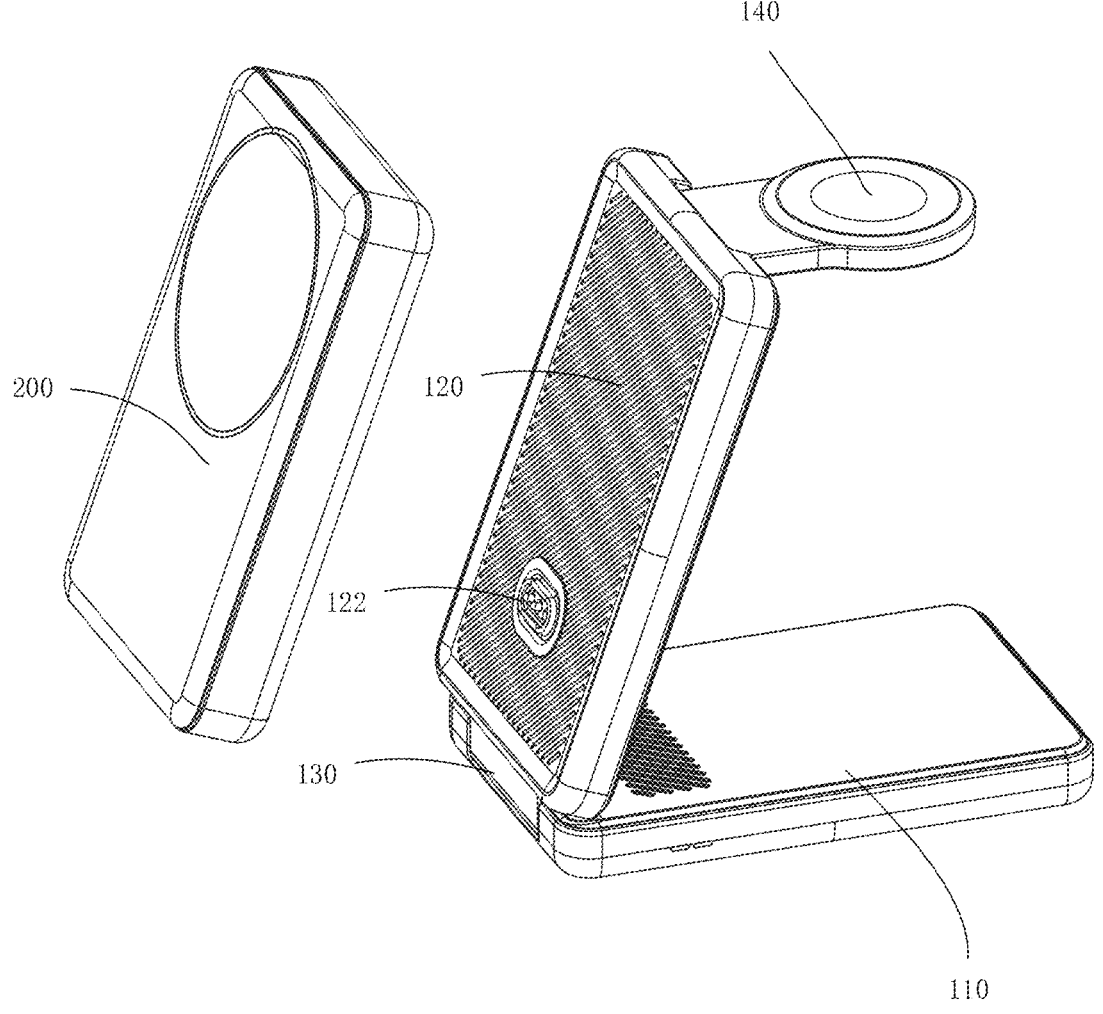
FIG. 3 is a structure diagram of yet another embodiment of the charging equipment provided by the present invention.
Figure 4:
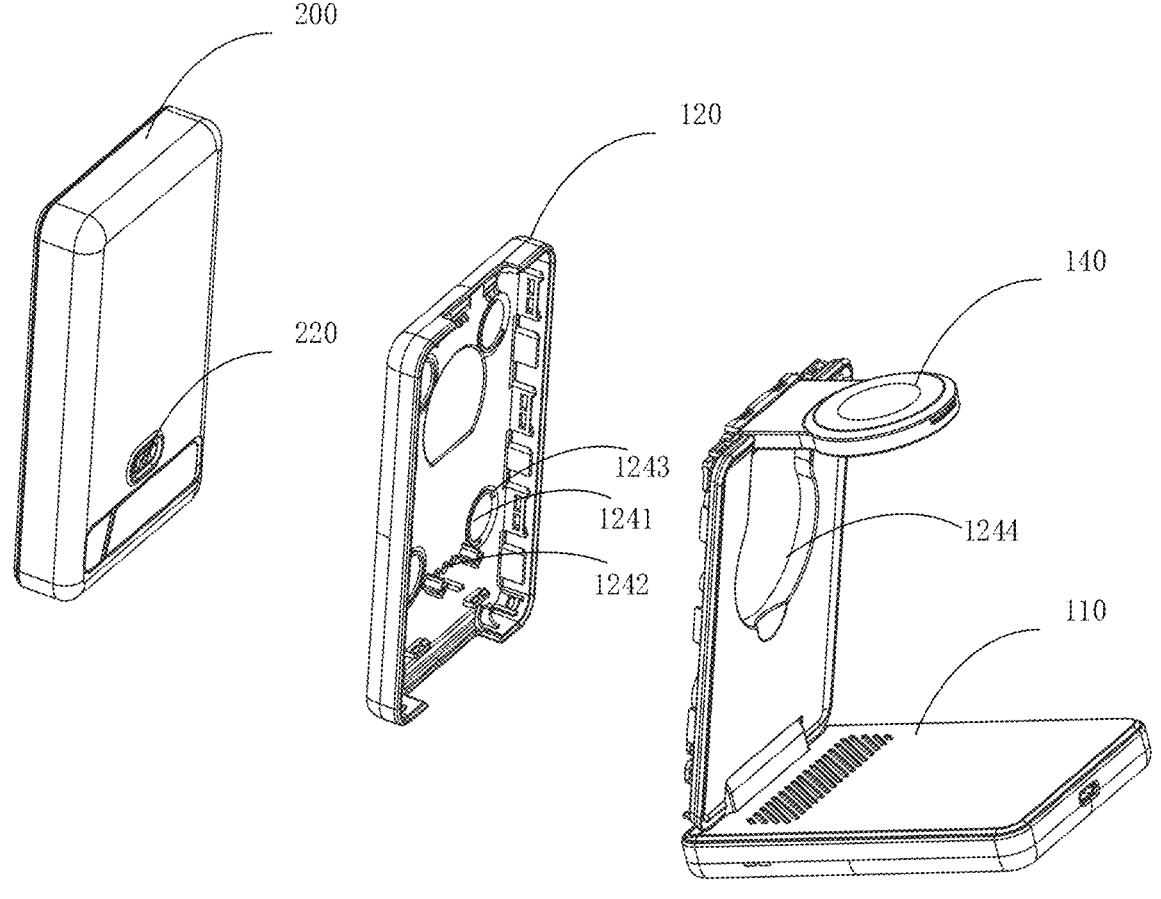
FIG. 4 is a structure diagram of still another embodiment of the charging equipment provided by the present invention.
Figure 5:
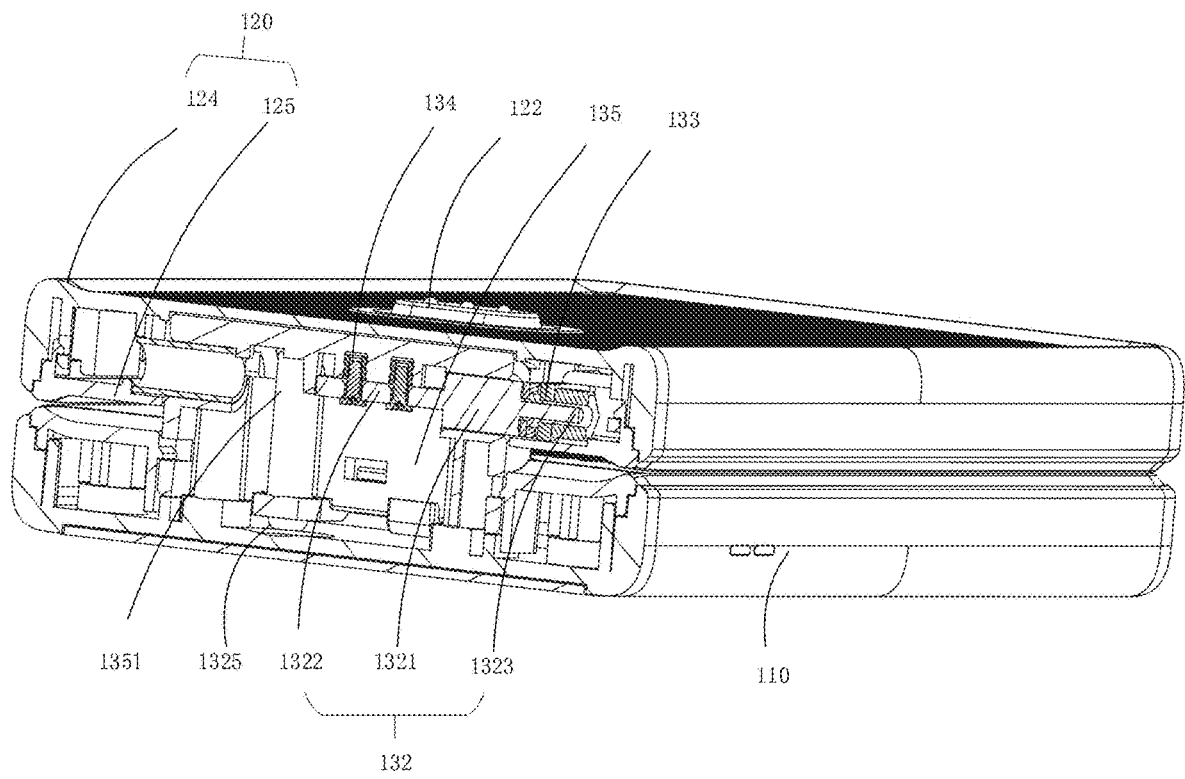
FIG. 5 is a sectional view of the charging equipment provided by the present invention.

Referring to FIG. 3 and FIG. 4, in the embodiment, the charging bracket 100 further includes a second supporting portion 140. A second rotating shaft assembly 150 is arranged on the second end of the first supporting portion 120. The second supporting portion 140 is rotatably connected to the second end of the first supporting portion 120 via the second rotating shaft assembly 150.

In this embodiment, the second supporting portion 140 achieves a rotational connection with the second end of the first supporting portion 120 via the second rotating shaft assembly 150. The position and angle of the second supporting portion 140 can be flexibly adjusted as required, so as to meet the supporting needs of different equipment. Specifically, the first supporting portion 120 not only undertakes the charging task of the mobile power source 200, but also provides a stable supporting function. Differently, the second supporting portion 140 is specifically configured for supporting small devices such as smart bracelets or watches.

The second rotating shaft assembly 150 is capable of enabling the second supporting portion 140 to rotate freely and to be fixed at different angles, thereby facilitating users to place watch products. During the actual use, when the mobile power source 200 has been magnetically attached to the first supporting portion 120, users can place a watch on the second supporting portion 140 to make wireless charging or to get simple support by simply rotating the second supporting portion 140 to a suitable position. Thus, the functionality of the equipment is extended, thereby enabling a plurality of devices to achieve synergistic charging or get support without additional operation.

In the design of the existing charging equipment, the mobile power source 200 is usually only used as a portable power source. In addition, the mobile power source 200 of the existing charging equipment lacks a self-supporting structure, and is easy to slide or topple when placed on a desk top, which affects the charging stability.

To solve the problem mentioned above, referring to FIG. 10 and FIG. 12, in the embodiment, a second bracket 230 is arranged on the mobile power source 200. The second bracket 230 is rotatably connected to the mobile power source 200.

In this embodiment, the mobile power source 200 is provided with the second bracket 230. This bracket is connected to the mobile power source 200 by using a rotational connection mode. This connection structure enables the second bracket 230 to rotate flexibly relative to the mobile power source 200, so that the second bracket 230 is adjusted to a suitable supporting angle.

When in use, if the mobile power source 200 needs to be stably placed, users only need to manually rotate the second bracket 230, so that the second bracket 230 is rotated to a desired angle from a storage state of being attached to a surface of the mobile power source 200. In this case, a certain angle is formed between a supporting end of the second bracket 230 and a bottom portion or side wall of the mobile power source 200. By placing the mobile power source 200 on a flat surface such as a desk top, the bracket can bear part of the weight of the mobile power source 200 through structural strength of the bracket. Thus, the bracket is prevented from sliding or toppling. When the supporting function is not needed, the bracket can be rotated reversely to attach to the surface of the mobile power source 200, thereby reducing space occupation and not affecting the portability of the mobile power source 200.

Referring to FIG. 3 to FIG. 9, in the embodiment, the first supporting portion 120 includes a first upper housing 124.

The first upper housing 124 is provided with a first mounting position 1241 and a first mounting hole 1242. At least one portion of the first charging plug 122 is configured for extending out from the first mounting hole 1242.

The first supporting portion 120 further includes a first lower housing 125. The first lower housing 125 is provided with a first mounting block 1251. A first side of the first magnetic attraction member 121 is configured for abutting against the first mounting position 1241. A second side of the first magnetic attraction member 121 is configured for abutting against the first mounting block 1251.

In this embodiment, the first upper housing 124 is provided with the first mounting position 1241 and the first mounting hole 1242. One portion of the first charging plug 122 is configured for extending out from the first mounting hole 1242, so as to realize an electrical connection function. The first lower housing 125 is provided with the first mounting block 1251. Thus, a clamping space is formed by the cooperation between the first lower housing 125 and the first upper housing 124. The first magnetic attraction member 121 is arranged in the clamping space. The first side of the first magnetic attraction member 121 is configured for abutting against a surface of the first mounting position 1241. The second side of the first magnetic attraction member 121 is directly contacted to a supporting surface of the first mounting block 1251. This bidirectional abutment structure makes the magnetic attraction member subjected to bidirectional constraint in a longitudinal direction, thereby avoiding positional deviation or looseness when subjected to force.

In the embodiment, a first limiting ring 1243 is further arranged on the first mounting position 1241. The first side of the first magnetic attraction member 121 is connected to the first limiting ring 1243.

Further, the first limiting ring 1243 is further arranged on the first mounting position 1241. The first limiting ring 1243 is configured for extending circumferentially around the magnetic attraction member. The first side of the first magnetic attraction member 121 is embedded in the first limiting ring 1243. A horizontal displacement of the first magnetic attraction member 121 is limited by a radial constraint of a ring wall. The first limiting ring and the mounting block form a synergistic effect. The first limiting ring provides lateral positioning and the mounting block provides bottom support. Thus, the first limiting ring and the mounting block jointly ensure the stability of the magnetic attraction member in the three-dimensional space. The design not only simplifies the assembly process. The magnetic attraction member can be fixed simply by being placed in the mounting position and tightened by the mounting block of the lower housing. Meanwhile, the design also avoids deviation caused by attraction force or vibration of the magnetic attraction member through a mechanical limit.

Figure 10:
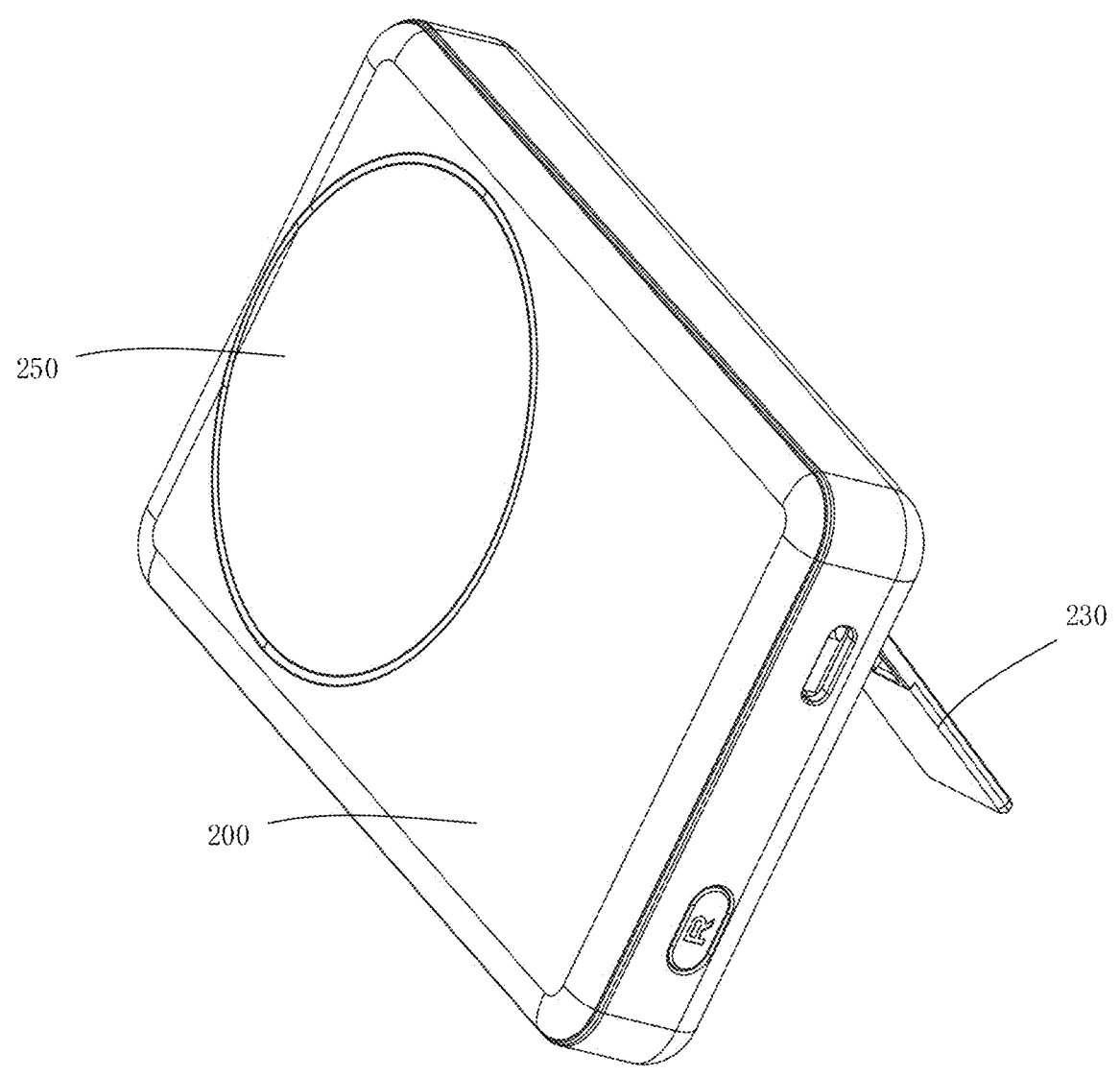
FIG. 10 is a structure diagram of the mobile power source provided by the present invention.
Figure 11:
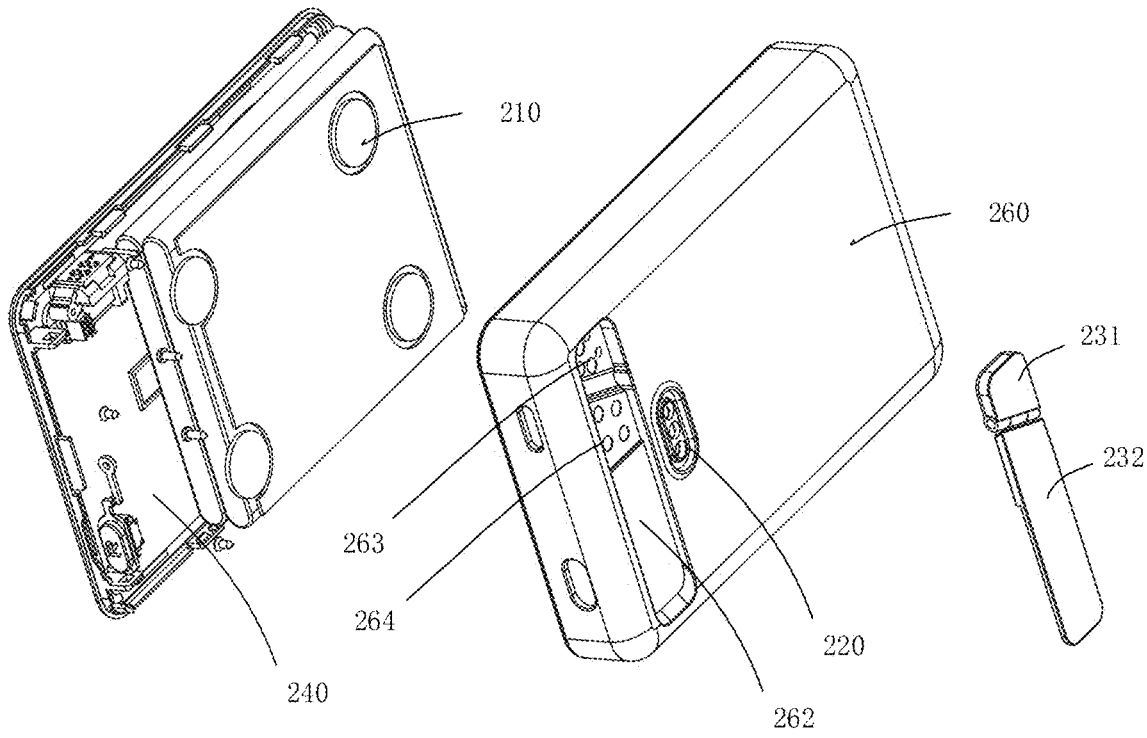
FIG. 11 is an exploded view of an angle of the mobile power source provided by the present invention.
Figure 12:
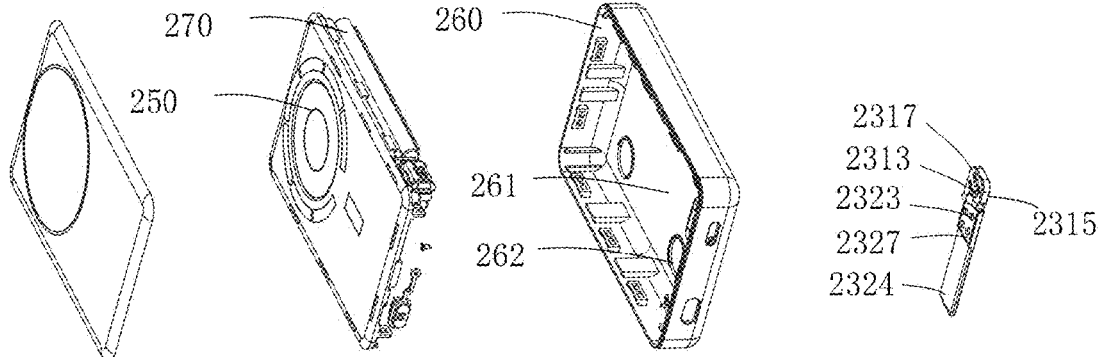
FIG. 12 is an exploded view of another angle of the mobile power source provided by the present invention.
Figure 13:
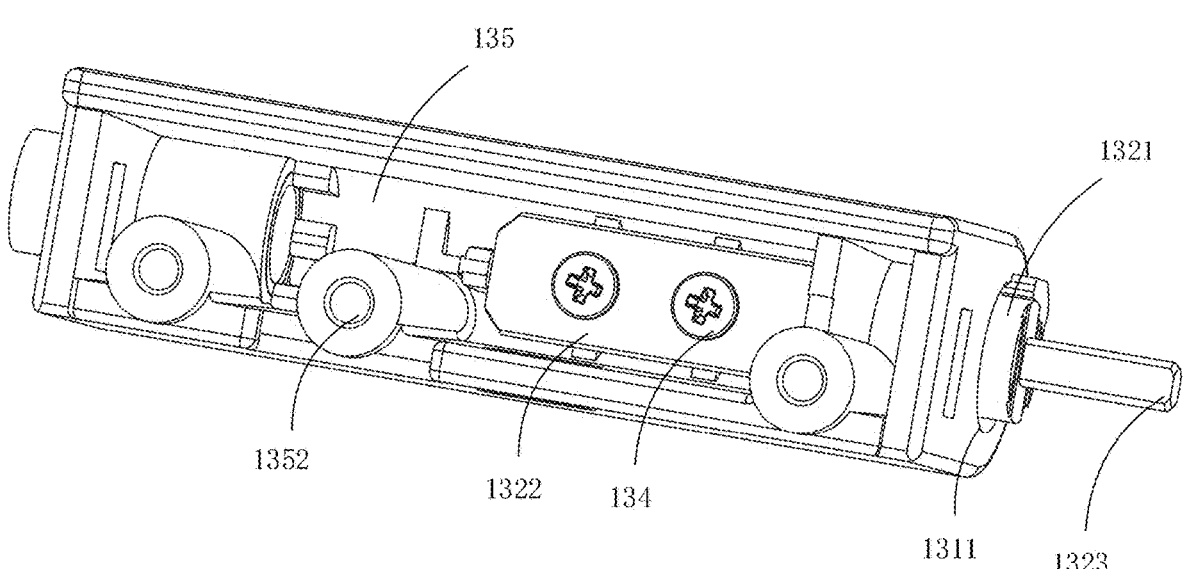
FIG. 13 is a structure diagram of the first rotating shaft assembly provided by the present invention.
Figure 14:
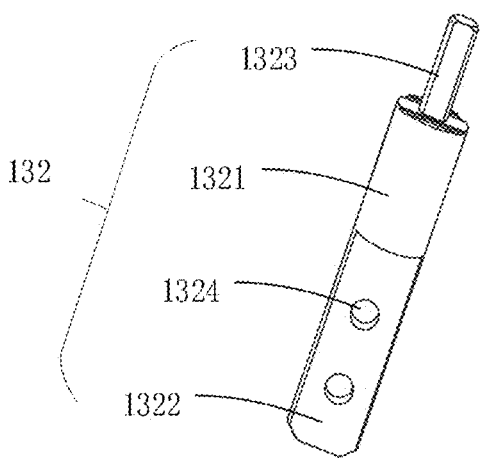
FIG. 14 is an exploded view of the first rotating shaft assembly provided by the present invention.
Figure 14:
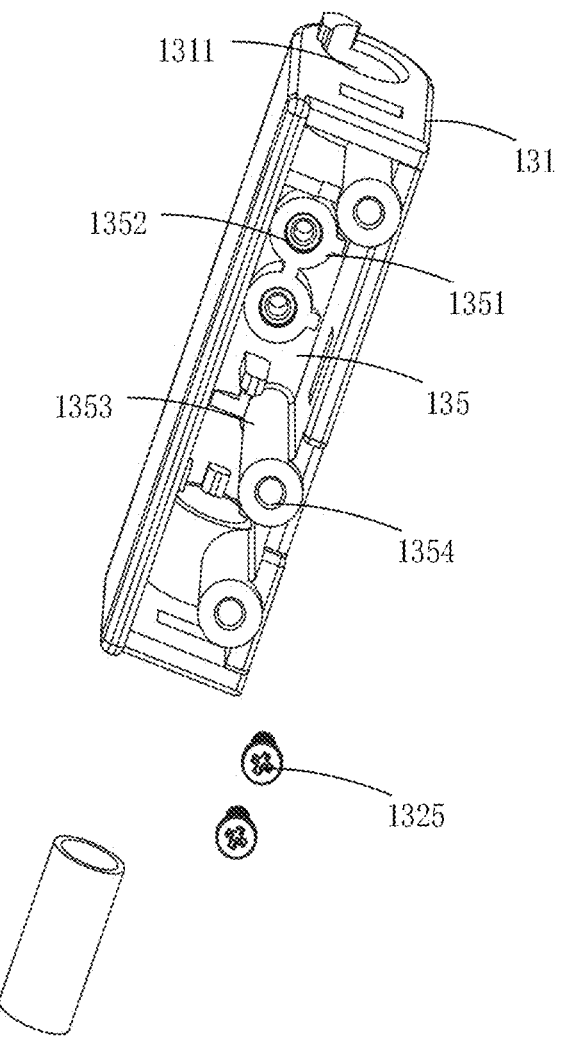
Figure 15:
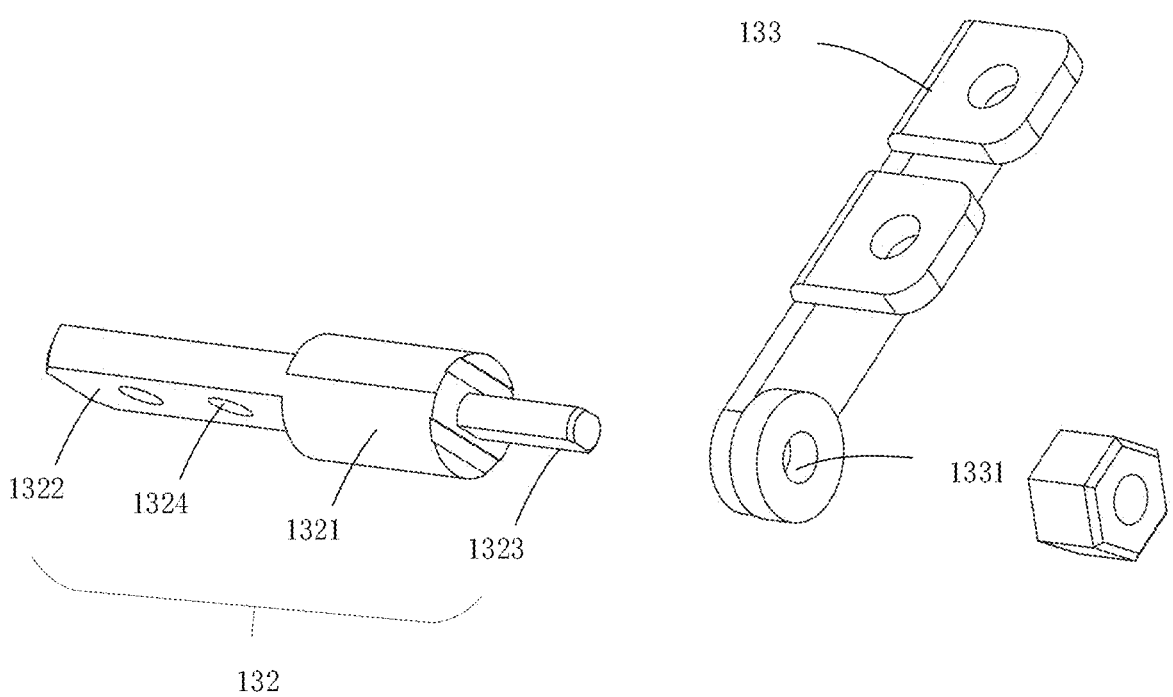
FIG. 15 is an exploded view of the mounting structure of the first connecting member and the first mounting portion provided by the present invention.
Figure 16:
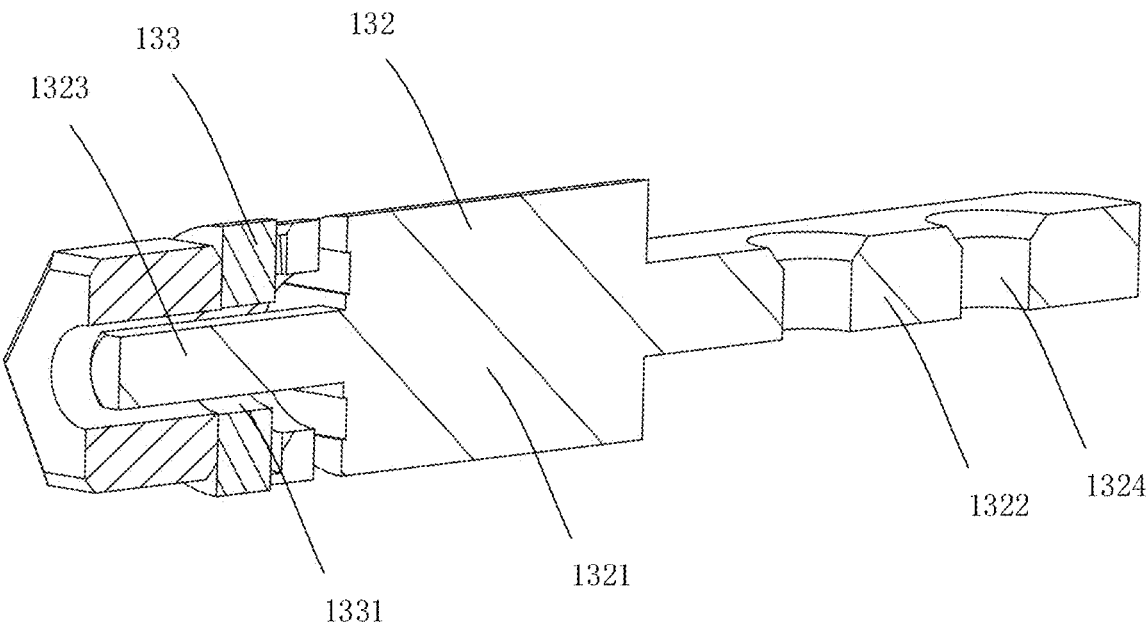
FIG. 16 is a sectional view of the mounting structure of the first connecting member and the first mounting portion provided by the present invention.

Referring to FIG. 10 to FIG. 12, in the embodiment, the mobile power source 200 includes a second upper housing 240.

A second wireless charging module 250 is arranged on the second upper housing 240.

The mobile power source 200 further includes a second lower housing 260. The second upper housing 240 is detachably connected to the second lower housing 260. A first accommodating cavity 261 is formed in the second lower housing 260. A second mounting position 262 is arranged on a bottom wall of the first accommodating cavity 261. The second magnetic attraction member 210 is arranged in the second mounting position 262.

A second battery module 270 is arranged on the first accommodating cavity 261.

In this embodiment, the second magnetic attraction member 210 achieves compact installation with the battery module through a layered layout. The second upper housing 240 and the second lower housing 260 use a detachable connection mode, so as to constitute a main frame of the equipment. A surface of the second upper housing 240 integrates the second wireless charging module 250, thereby directly providing a wireless charging function for external devices. The first accommodating cavity 261 is formed in an inner portion of the second lower housing 260. The bottom wall of the first accommodating cavity 261 is provided with the second mounting position 262. The second magnetic attraction member 210 is precisely embedded in the mounting position. Thus, surfaces of the magnetic attraction member and the housings are ensured to remain flat by this bottom wall positioning design. Moreover, this avoids protruding and prevents aesthetic of the equipment from being influenced. Meanwhile, a magnetic attraction surface is enabled to keep a best attraction distance with the second magnetic attraction member 121 of the charging bracket 100.

The second battery module 270 is stored in the first accommodating cavity 261. The battery module is fixed in an inner space of the accommodating cavity. The battery module and the second magnetic attraction member 210 at the bottom together form a layered arrangement. The battery module serves as an energy core of the mobile power source 200. The battery module, the second wireless charging module 250 and the second charging plug 220 together form a power supply channel through an internal circuit. When the mobile power source 200 is used alone, the battery module is configured for supplying power for the wireless charging module. When the mobile power source 200 is placed on the charging bracket 100, the battery module is configured for receiving external electricity energy through the second charging plug 220. The housing is a detachable connection structure, such as using a buckle or a screw to fix. This not only facilitates installing magnetic attraction member and battery module in sequence during production and assembly, but also provides possibility for later maintenance and replacement.

The layout makes full use of a longitudinal space inside the housing, so that the magnetic attraction positioning and the power supply function do not interfere with each other. The magnetic attraction member is fixed at the bottom to ensure the attraction stability. The battery module is centrally arranged to optimize the distribution of the center of gravity, and the wireless charging module is placed at a top to ensure the optimal energy transmission efficiency. The layered design ensures the reliable operation of each functional module, and meanwhile realizes the compactness of an overall structure of the equipment.

Referring to FIG. 4, in the embodiment, the second rotating shaft assembly 150 includes a second mounting portion 151.

The second mounting portion 151 is arranged in the second lower housing 260. A first end of the second mounting portion 151 is connected to the second lower housing 260, and a second end of the second mounting portion 151 is provided with a third mounting hole 152.

The second rotating shaft assembly 150 further includes a second rotating shaft 153. An end of the second supporting portion 140 opposite to the second lower housing 260 is provided with a second rotating shaft hole 141. The first end of the second mounting portion 151 is rotatably connected to the second rotating shaft hole 141, and the second end of the second mounting portion 151 is rotatably connected to the third mounting hole 152.

In this embodiment, as a core connecting member, the second mounting portion 151 is internally arranged in the second lower housing 260. The first end of the second mounting portion 151 forms a rigid connection with the second lower housing 260 through a mechanical connection mode, such as screw fixing or buckle locking, so as to ensure the stability of the overall structure. The second end of the second mounting portion 151 is provided with the third mounting hole 152. The second end of the second mounting portion 151 and the second rotating shaft 153 together form a rotating pair. At the same time, the end of the second supporting portion 140 close to the second lower housing 260 is provided with the second rotating shaft hole 141. The second rotating shaft hole 141 realizes a pivoting connection with the first end of the second mounting portion 151 via the second rotating shaft 153.

This assembly establishes a degree of freedom of rotation through a double pivot structure. The first end of the second mounting portion 151 is fixed with the second lower housing 260 to form a stationary end, and the second end of the second mounting portion 151 and the second rotating shaft 153 together form a first rotating pair through the third mounting hole 152. The second supporting portion 140 and the second end of the second mounting portion 151 together form a second rotating pair through the second rotating shaft hole 141. The two rotating pairs are arranged on a same shaft, so that the second supporting portion 140 is capable of making angle adjustment around a single axis. When users apply a force to the second supporting portion 140, the second supporting portion 140 rotates with the second rotating shaft 153 as the center of a circle, and the second mounting portion 151 undertakes a force transmission function to distribute torques to a main body structure of the second lower housing 260, thereby avoiding force concentration in partial areas.

Figure 6:
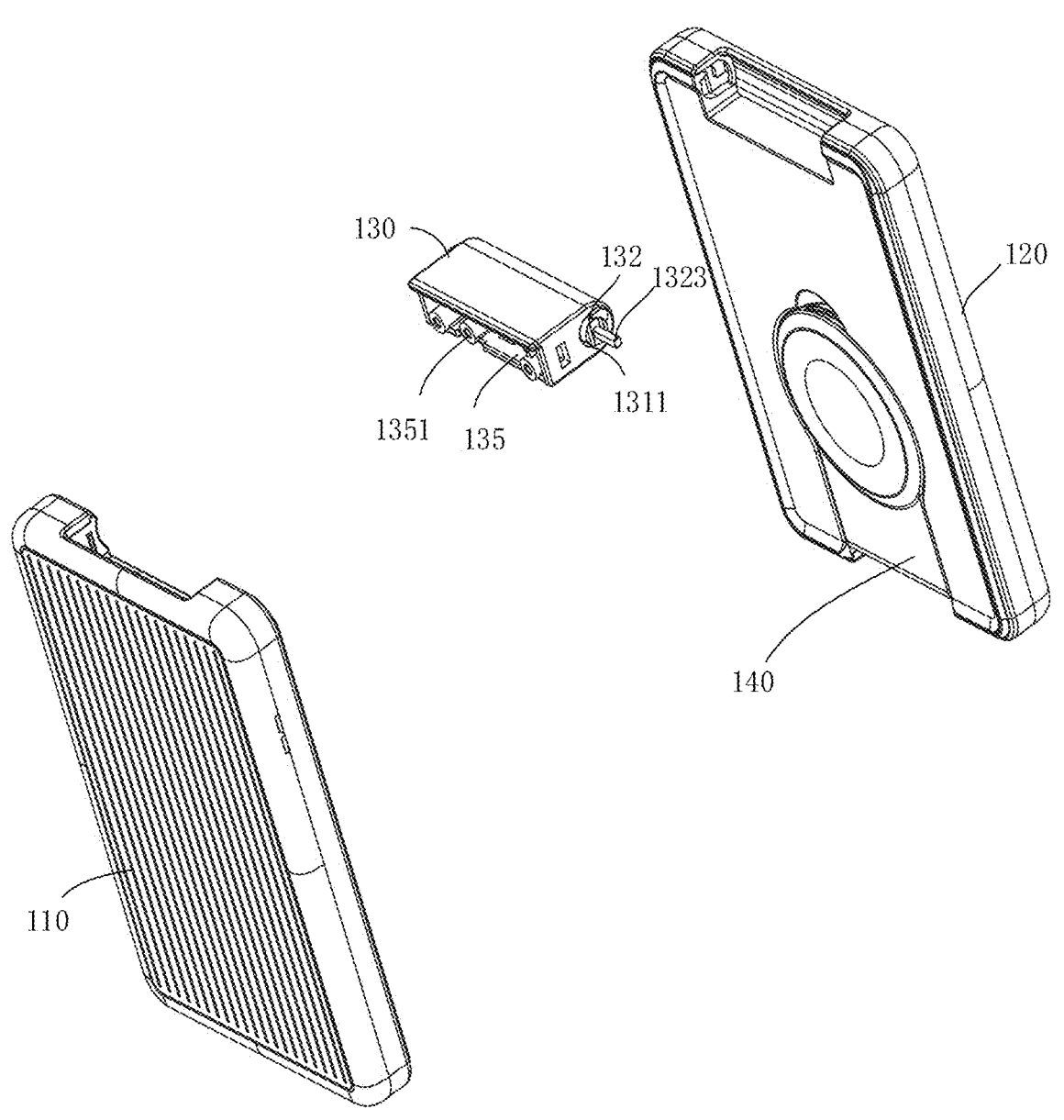
FIG. 6 is an exploded view of an angle of the charging equipment provided by the present invention.
Figure 7:
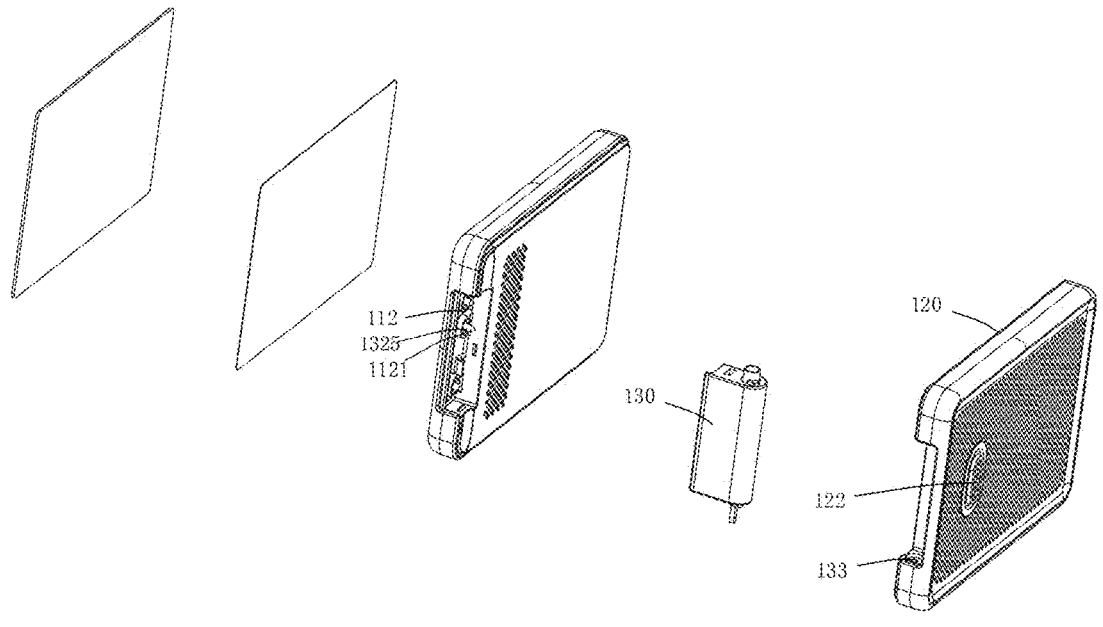
FIG. 7 is an exploded view of another angle of the charging equipment provided by the present invention.
Figure 8:
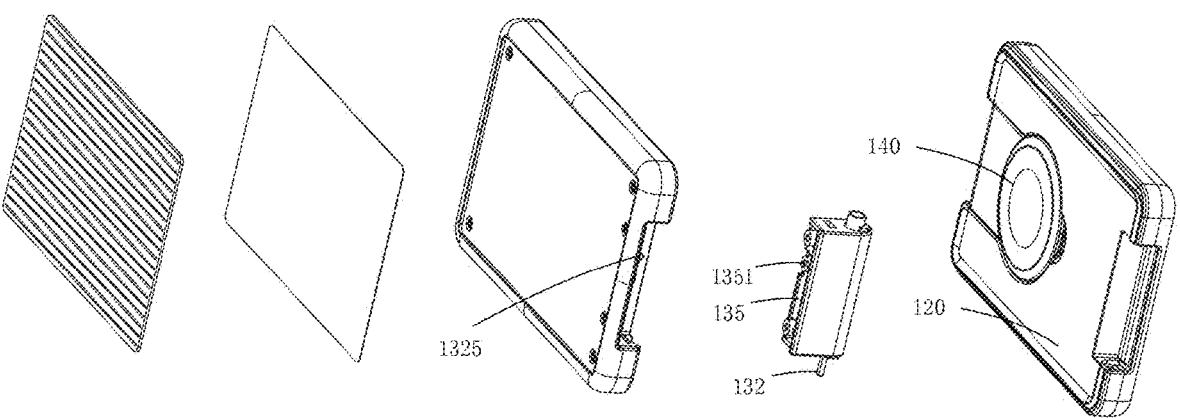
FIG. 8 is an exploded view of yet another angle of the charging equipment provided by the present invention.
Figure 9:
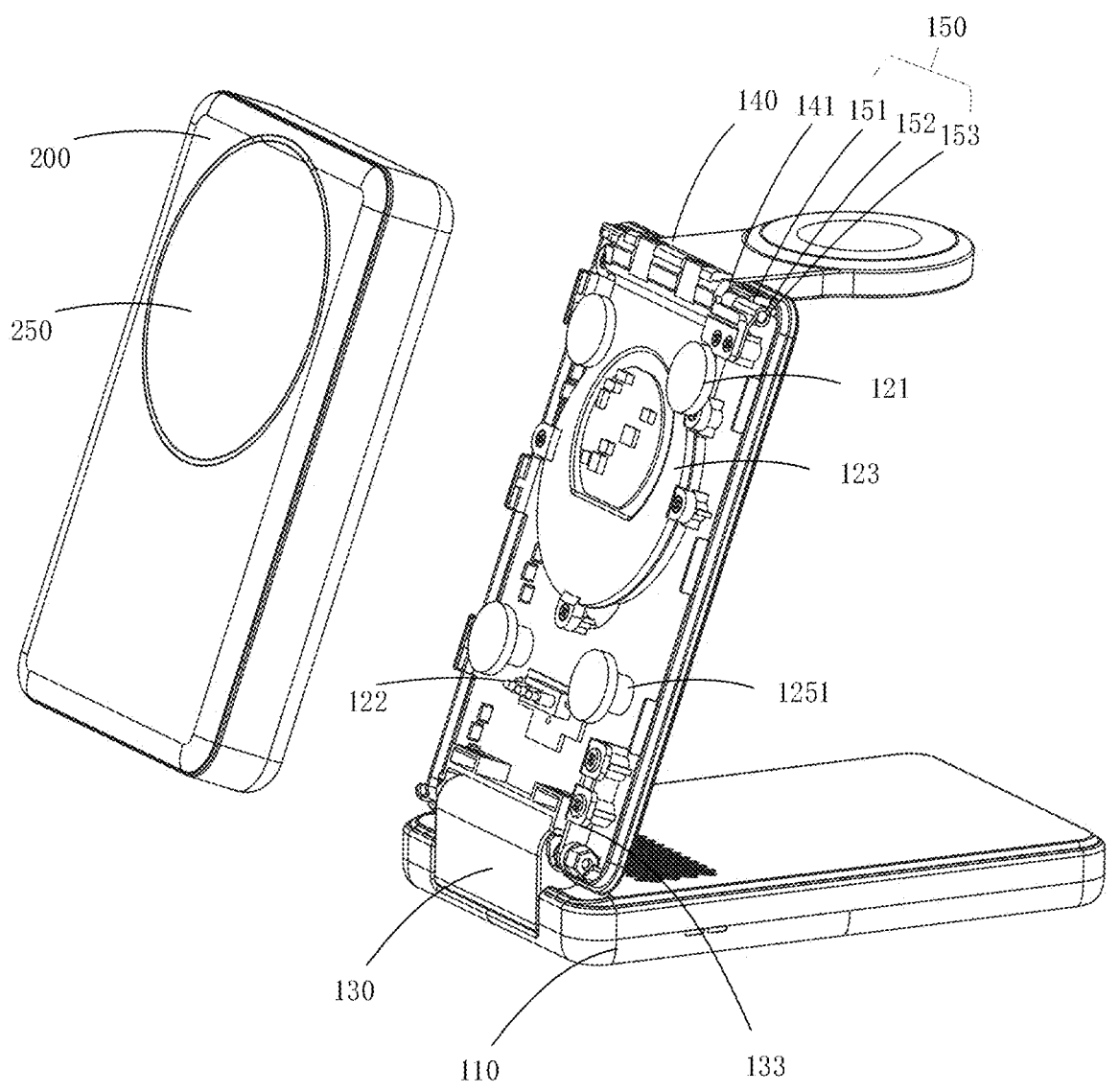
FIG. 9 is a structure diagram removing the first upper housing of the charging equipment provided by the present invention.

Referring to FIG. 3, FIG. 4 and FIG. 6, in the embodiment, a second accommodating cavity 1244 configured for accommodating the second supporting portion 140 is further defined in the first lower housing 125. A shape of the accommodating cavity corresponds to an outer shape of the second support portion 140. Thus, when the rotating shaft assembly rotates parallel to the first lower housing 125, the second support portion 140 is capable of being completely embedded inside the cavity. This ensures that, after being folded, the outer surface of the second support portion 140 forms a continuous flat surface with an outer wall of the first lower housing 125, thereby eliminating the defect of protruding during the storage of traditional bracket.

Referring to FIG. 5 to FIG. 9, and FIG. 13 to FIG. 16, in the embodiment, the first rotating shaft assembly 130 includes a first bracket 131.

A first end of the first bracket 131 is detachably connected to the base 110, and a first rotating shaft hole 1311 is defined in a second end of the first bracket 131.

The first rotating shaft assembly 130 further includes a first connecting member 132. A first end of the first connecting member 132 is configured for passing through the first rotating shaft hole 1311, and the first end of the first connecting member 132 is configured for extending out from the first mounting hole 1242.

The first rotating shaft assembly 130 further includes a first mounting portion 133. A first end of the first mounting portion 133 is connected to the second lower housing 260, and a second end of the first mounting portion 133 is provided with a second mounting hole 1331. The first end of the first connecting member 132 is configured for passing through the second mounting hole 1331. The first connecting member 132 is rotatably connected to the second mounting hole 1331.

In the embodiment, the first rotating shaft assembly 130 realizes a stable connection and an angle adjustment function between the base 110 and the second lower housing 260 through a layered structure. The first bracket 131 serves as a transitional component. The first end of the first bracket 131 forms a detachable connection with the base 110 through a buckle or a threaded structure such as a bolt. This facilitates maintenance or replacement. The first rotating shaft hole 1311 defined in the second end the first bracket 131 is configured for accommodating the first end of the first connecting member 132. The first connecting member 132 is configured for protruding from the second mounting hole 1331 to form an axial fixation. The first mounting portion 133 serves as a core bearing component. The first end of the first mounting portion 133 is fixedly connected to the second lower housing 260. The second mounting hole 1331 on the second end of the first mounting portion 133 forms a rotating pair with a protruding end of the first connecting member 132. In this way, the first mounting portion 133 is capable of rotating around an axis of the first connecting member 132.

When the base 110 is fixed, driven by an external force, the second lower housing 260 is configured for driving the first mounting portion 133 to rotate. The torque is transmitted to the first bracket 131 through the first connecting member 132, and finally a reaction force is bored by the base 110.

In the use of the charging equipment, the first rotating shaft assembly 130 is required to ensure the stability of the connection of each component while realizing a flexible rotation of the first supporting portion 120. In this way, looseness due to long-term use or an external force is avoided. A traditional connecting structure of rotating shaft sometimes has the problems of increased fit clearance and loose connection after multiple rotations, which affects the normal use and service life of the equipment.

In order to further optimize the structure of the first rotating shaft assembly 130, increase the stability and reliability of the connection of the first rotating shaft assembly 130, and ensure that the first supporting portion 120 maintains a good coordinating condition. Referring to FIG. 13 to FIG. 16, in the embodiment, the first rotating shaft assembly 130 includes a first fastener 134.

The first bracket 131 is further provided with a third accommodating cavity 135. A first mounting post 1351 is arranged on an inner wall of the third accommodating cavity 135. The first mounting post 1351 is provided with a first threaded hole 1352.

The first connecting member 132 includes a first connecting portion 1321. A first extending portion 1322 and a second extending portion 1323 are respectively arranged on two opposite ends of the first connecting portion 1321. The first connecting portion 1321 is configured for passing through the first rotating shaft hole 1311. A fourth mounting hole 1324 is defined in the first extending portion 1322. The first fastener 134 is threadedly connected to the first threaded hole 1352 through the fourth mounting hole 1324. The second extending portion 1323 is configured for extending out from the first rotating shaft hole 1311 and passing through the second mounting hole 1331. The second extending portion 1323 is rotatably connected to the second mounting hole 1331.

In this embodiment, the first fastener 134 is configured for tightly fixing the first extension portion 1322 of the first connecting member 132 to the first mounting post 1351 of the first bracket 131. Thus, a position of the first connecting portion 1321 is stably fixed in the first rotating shaft hole 1311, which reduces the possibility of shaking. Meanwhile, a rotational connection between the second extension portion 1323 and the second mounting hole 1331 ensures the flexibility of rotation of the first supporting portion 120. Moreover, a fixed portion and a movable portion perform respective duties and cooperate with each other.

When users adjust the angle of the first supporting portion 120, the second extension portion 1323 is configured for rotating in the second mounting hole 1331. The position of the first connecting portion 1321 in the first rotating shaft hole 1311 is enabled to remain stable due to the fixing of the first fastener 134. Thus, displacement or looseness is avoided. This fixing mode is capable of effectively resisting the abrasion and external force impact caused by long-term rotation, and ensures that the parts always keep precise coordination.

Referring to FIG. 10 to FIG. 12, and FIG. 17, in the embodiment, the second bracket 230 includes a third mounting portion 231.

The third mounting portion 231 is detachably connected to the mobile power source 200.

The second bracket 230 further includes a third supporting portion 232. A first end of the third supporting portion 232 is rotatably connected to the third mounting portion 231. The third supporting portion 232 is a free end.

In this embodiment, the second bracket 230 includes the third mounting portion 231 and the third supporting portion 232. The third mounting portion 231 is detachably connected to the mobile power source 200. Thus, this enables the bracket to be removed from the mobile power source 200 when the bracket is not needed, thereby reducing space occupation. The first end of the third supporting portion 232 is rotatably connected to the third mounting portion 231. The second end of the third supporting portion 232 is used as the free end, and is capable of being rotatably adjusted to a suitable angle to achieve a supporting effect.

When it is necessary to support the mobile power source 200, install the third mounting portion 231 on the mobile power source 200, and then rotate the third supporting portion 232, so that the free end of the third supporting portion 232 is in contact with the placement plane. After that, a most stable supporting angle is found by adjusting an angle between the third supporting portion 232 and the third mounting portion 231. In this case, the third supporting portion 232, the third mounting portion 231 and the mobile power source 200 together form a triangular supporting structure. Moreover, the mobile power source 200 is ensured to not easily topple by utilizing the stability of the triangle.

Figure 17:
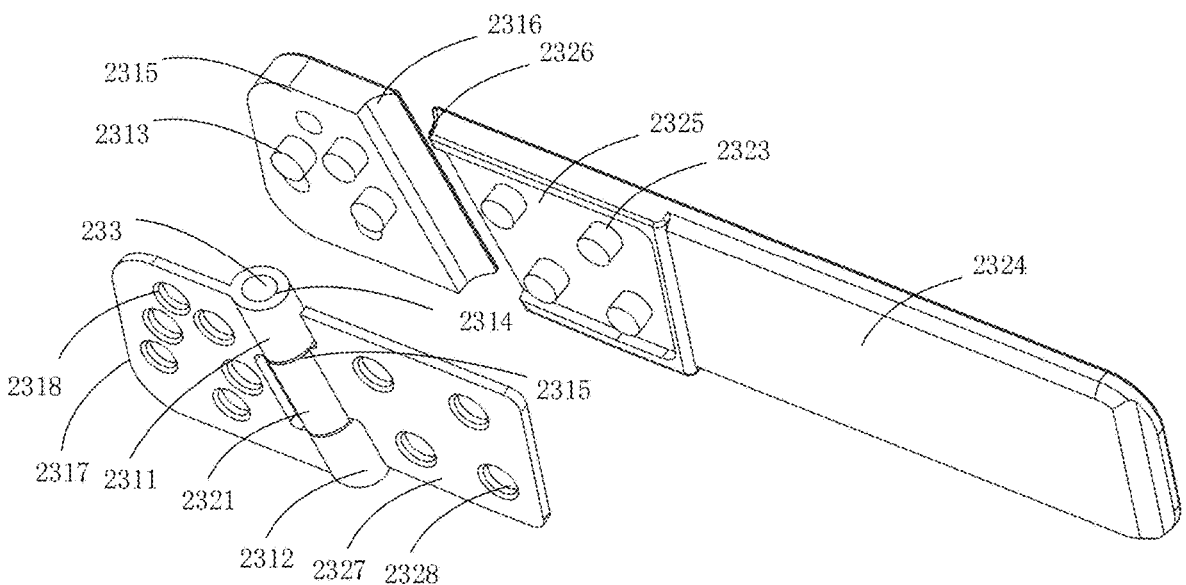
FIG. 17 is an exploded view of the second bracket provided by the present invention.

Referring to FIG. 17, in the embodiment, the second bracket 230 includes a third rotating shaft 233.

A first protrusion 2311 and a second protrusion 2312 are arranged on an end of the third mounting portion 231 opposite to the third supporting portion 232. The first protrusion 2311 and the second protrusion 2312 are spaced apart from each other. The first protrusion 2311 and the second protrusion 2312 are each provided with a first through hole 2314.

A first end of the third supporting portion 232 is provided with a third protrusion 2321. The third protrusion 2321 is arranged between the first protrusion 2311 and the second protrusion 2312. The third protrusion 2321 is provided with a second through hole 2322. The third rotating shaft 233 is inserted through the first through hole 2314 and the second through hole 2322.

Referring to FIG. 11 and FIG. 17, in the embodiment, the mobile power source 200 is provided with at least one first engaging slot 263. The third mounting portion 231 is provided with at least one first engaging block 2313. The first engaging block 2313 is engaged with the first engaging slot 263.

In the embodiment, the mobile power source 200 is provided with at least one second engaging slot 264. The third supporting portion 232 is provided with at least one second engaging block 2323. The second engaging block 2323 is engaged with the second engaging slot 264.

The mobile power source 200 is provided with at least one first engaging slot 263. The third mounting portion 231 is correspondingly provided with at least one first engaging block 2313. Through an engaged connection between the first engaging block 2313 and the first engaging slot 263, a detachable connection between the third mounting portion 231 and the mobile power source 200 is achieved. Similarly, the mobile power source 200 is provided with at least one second engaging slot 264. The third supporting portion 232 is provided with at least one second engaging block 2323. With the help of an engaged connection between the second engaging block 2323 and the second engaging slot 264, a connection between the third supporting portion 232 and the mobile power source 200 is finished.

The principle of this engaged structure is to utilize the shape matching and elastic deformation of the engaging block and the engaging slot. When the third mounting portion 231 is installed, the first engaging block 2313 is aligned with the first engaging slot 263 and a suitable pressure is applied. Thus, the engaging block has a slight deformation, and then the engaging block is engaged into the engaging slot, so as to form a stable connection. During the assembly, only need to apply a counter force to make the engaging block detach from the engaging slot. A connection process of the third supporting portion 232 and the mobile power source 200 is similar to a connection process of the first engaging block 2313 and the first engaging slot 263. Similarly, the cooperation between the second engaging block 2323 and the second engaging slot 264 is capable of achieving reliable fixing and convenient assembly.

Referring to FIG. 11 and FIG. 17, in the embodiment, the third mounting portion 231 includes a second mounting block 2315.

The first engaging block 2313 is arranged on the second mounting block 2315. The second mounting block 2315 is further provided with a first avoidance position 2316 configured for avoiding the first protrusion 2311 and the second protrusion 2312.

The third mounting portion 231 includes a first base plate 2317. The second mounting block 2315 is engaged with the first base plate 2317. A third engaging slot 2318 is defined in the first base plate 2317. The third engaging slot 2318 is configured for penetrating through the first base plate 2317. The first engaging block 2313 is engaged with the third engaging slot 2318.

The first protrusion 2311 and the second protrusion 2312 are spaced apart and arranged on an end of the first base plate 2317 opposite to the third supporting portion 232.

The third mounting portion 231 includes the second mounting block 2315 and the first base plate 2317. The first engaging block 2313 is arranged on the second mounting block 2315. The first engaging block 2313 is configured for cooperating with the first engaging slot 263 of the mobile power source 200 to realize a connection. Meanwhile, the second mounting block 2315 is further provided with a first avoidance position 2316, so as to specially reserve space for the first protrusion 2311 and the second protrusion 2312, thereby avoiding mutual obstruction between the structures. The first base plate 2317 is engaged with the second mounting block 2315 by using an engaged connection mode. The third engaging slot 2318 on the first base plate 2317 is configured for penetrating through the first base plate 2317. In addition, the third engaging slot 2318 is engaged with the first engaging block 2313, thereby further fixing a position of the second mounting block 2315. Moreover, the first protrusion 2311 and the second protrusion 2312 are spaced apart and arranged on the end of the first base plate 2317 opposite to the third supporting portion 232. This provides a structural foundation for a rotational connection between the first base plate 2317 and the third supporting portion 232.

The arrangement of the first avoidance position 2316 is configured for effectively preventing the interference between the second mounting block 2315 and the first protrusion 2311 and the interference between the second mounting block 2315 and the second protrusion 2312. This ensures the smoothness of rotation of the third supporting portion 232. A multiple fixing is formed by an engaged connection between the second mounting block 2315 and the first base plate 2317, and the cooperation between the first engaging block 2313 and the third engaging slot 2318. This increases the structure strength of an overall structure of the third supporting portion 232, thereby avoiding looseness during use.

Referring to FIG. 11 and FIG. 17, in the embodiment, the third supporting portion 232 includes a supporting block 2324. The supporting block 2324 is provided with a second mounting slot 2325 and a second avoidance position 2326 configured for avoiding the first protrusion 2311, the second protrusion 2312 and the third protrusion 2321. The second engaging block 2323 is arranged on a bottom wall of the second mounting slot 2325.

The third supporting portion 232 further includes a second base plate 2327. The second base plate 2327 is installed in the second mounting slot 2325. A fourth mounting slot 2328 is defined in the second base plate 2327. The fourth mounting slot 2328 is configured for penetrating through the second base plate 2327. The second engaging block 2323 is engaged with the fourth engaging slot 2328. The third protrusion 2321 is arranged on an end of the second base plate 2327 distal from the second mounting slot 2325.

The third supporting portion 232 includes the supporting block 2324 and the second base plate 2327. The supporting block 2324 is provided with the second mounting slot 2325 configured for installing the second base plate 2327. The supporting block 2324 is further provided with the second avoidance position 2326 specially configured for avoiding the first protrusion 2311, the second protrusion 2312 and the third protrusion 2321. Thus, structural interference during rotation or support is prevented. The second engaging block 2323 is arranged on a bottom wall of the second mounting slot 2325. The second engaging block 2323 is configured for cooperating with and connecting with the second engaging slot 264 of the mobile power source 200. The second base plate 2327 is mounted in the second mounting slot 2325. The fourth mounting slot 2328 on the second base plate 2327 is configured for penetrating through the second base plate 2327 and is engaged with the second engaging block 2323. Thus, a position of the second base plate 2327 can be further fixed. The third protrusion 2321 is arranged on the end of the second base plate 2327 distal from the second mounting slot 2325. This provides structural support for a rotational connection between the third protrusion 2321 with the third mounting portion 231.

Such design of the structure makes the cooperation among components closer and more reasonable. The second avoidance position 2326 is configured for effectively avoiding collision or obstruction among the supporting block 2324, the first protrusion 2311, the second protrusion 2312 and the third protrusion 2321 during rotation or support. This ensures smoothness of movement. The supporting block 2324 is capable of realizing a fixed connection with the second base plate 2327 through an engaged connection between the second engaging block 2323 and the fourth mounting slot 2328. Thus, the overall structural strength of the third supporting portion 232 is enhanced, and the possibility of looseness during use is reduced.

In the structure of the charging equipment, the connection stability between the first bracket 131 and the base 110 is an important section to ensure the stability of the overall structure. If the connection is not secure enough, when adjusting the angle of the first supporting portion 120 or moving the equipment, looseness and shaking may occur, thereby affecting the normal use of the equipment, and even causing safety hazards.

In the embodiment, a second mounting post 1353 is arranged in the third accommodating cavity 135. A second threaded hole 1354 is defined in the second mounting post 1353.

The third mounting block 112 is arranged on the base 110. A third through hole 1121 is defined in the third mounting block 112. A second fastener 1325 is inserted through the third through hole 1121. The second fastener 1325 is threadedly connected to the second threaded hole 1354.

The first bracket 131 is tightly fixed to the base 110 by using the feature of threaded connection. The threaded connection has a good self-locked character. The second fastener 1325 is configured for passing through the third through hole 1121 and is tightened with the second threaded hole 1354, so as to generate sufficient preload to firmly fix the first bracket 131 on the base 110, thereby effectively resisting a loosening tendency caused by the external force.

This solution significantly improves the stability of the connection between the first bracket 131 and the base 110 by the threaded connection. This reduces equipment failures caused by loose connection, and ensures the structural stability of the charging equipment in various using scenarios. Moreover, the service life of the equipment is prolonged, thereby making users feel more comfortable and reliable during use.

The present invention further proposes that the electronic device assembly includes an electronic device and the charging equipment mentioned above. The electronic device includes an induction coil and a battery. The first wireless charging module 123 and the induction coil are in cooperation with each other to charge the battery.

The present invention further provides an electronic device assembly. The electronic device assembly includes the electronic device and the charging equipment mentioned above. The electronic device includes the induction coil and the battery. The first wireless charging module 123 and the induction coil are in cooperation with each other to charge the battery.

A specific structure of the charging equipment refers to above embodiments. Since the electronic device assembly adopts all the technical solutions of all the above embodiments, so that the electronic device assembly at least has all the beneficial effects brought by the technical solutions of the above embodiments. Therefore, beneficial effects will not be repeated here.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A charging equipment, comprising:

a charging bracket, the charging bracket comprising a base and a first supporting portion, and a first magnetic attraction member and a first charging plug being arranged on the first supporting portion;

a mobile power source, the mobile power source comprising a second magnetic attraction member and a second charging plug, wherein the mobile power source is detachably connected to the charging base through a mutual magnetic attraction between the second magnetic attraction member and the first magnetic attraction member, and the second charging plug is configured for electrically connecting to the first charging plug, so that the mobile power source is charged;

wherein the charging bracket further comprises a first rotating shaft assembly, the first rotating shaft assembly is detachably connected to the base, a first end of the first supporting portion is rotatably connected to the first rotating shaft assembly, and a second end of the first supporting portion is a free end;

wherein the charging bracket further comprises a second supporting portion, a second rotating shaft assembly is arranged on the second end of the first supporting portion, and the second supporting portion is rotatably connected to the second end of the first supporting portion via the second rotating shaft assembly;

wherein the first supporting portion comprises:

a first upper housing, the first upper housing being provided with a first mounting position and a first mounting hole, and at least one portion of the first charging plug being configured for extending out from the first mounting hole;

a first lower housing, the first lower housing being provided with a first mounting block, a first side of the first magnetic attraction member being configured for abutting against the first mounting position, and a second side of the first magnetic attraction member being configured for abutting against the first mounting block.

2. The charging equipment according to claim 1, wherein a first wireless charging module is further arranged on the first supporting portion, and the first wireless charging module is configured for charging electrical equipment.

3. The charging equipment according to claim 1, wherein a second bracket is arranged on the mobile power source, and the second bracket is rotatably connected to the mobile power source.

4. The charging equipment according to claim 3, wherein the second bracket comprises a third rotating shaft, a first protrusion and a second protrusion are arranged on an end of the third mounting portion opposite to the third supporting portion, the first protrusion and the second protrusion are spaced apart from each other, and the first protrusion and the second protrusion are each provided with a first through hole;

a first end of the third supporting portion is provided with a third protrusion, the third protrusion is arranged between the first protrusion and the second protrusion, the third protrusion is provided with a second through hole, and the third rotating shaft is inserted through the first through hole and the second through hole.

5. The charging equipment according to claim 4, wherein a second mounting post is arranged in the third accommodating cavity, and a second threaded hole is defined in the second mounting post;

a third mounting block is arranged on the base, a third through hole is defined in the third mounting block, a second fastener is inserted through the third through hole, and the second fastener is threadedly connected to the second threaded hole.

6. The charging equipment according to claim 1, wherein a first limiting ring is further arranged on the first mounting position, and the first side of the first magnetic attraction member is connected to the first limiting ring.

7. The charging equipment according to claim 1, wherein the mobile power source comprises:

a second upper housing, a second wireless charging module being arranged on the second upper housing;

a second lower housing, the second upper housing being detachably connected to the second lower housing, the second lower housing being configured for forming a first accommodating cavity, a second mounting position being arranged on a bottom wall of the first accommodating cavity, and the second magnetic attraction member being arranged in the second mounting position;

a second battery module is arranged on the first accommodating cavity.

8. The charging equipment according to claim 1, wherein the second rotating shaft assembly comprises:

a second mounting portion, the second mounting portion being arranged in the second lower housing, a first end of the second mounting portion being connected to the second lower housing, and a second end of the second mounting portion being provided with a third mounting hole;

a second rotating shaft, an end of the second supporting portion opposite to the second lower housing being provided with a second rotating shaft hole, the first end of the second mounting portion being rotatably connected to the second rotating shaft hole, and the second end of the second mounting portion being rotatably connected to the third mounting hole.

9. The charging equipment according to claim 1, wherein a second accommodating cavity configured for accommodating the second supporting portion is further defined in the first lower housing.

10. The charging equipment according to claim 1, wherein the first rotating shaft assembly comprises:

a first bracket, a first end of the first bracket being detachably connected to the base, a first rotating shaft hole being defined in a second end of the first bracket, a first connecting member, a first end of the first connecting member being configured for passing through the first rotating shaft hole, and the first end of the first connecting member being configured for extending out from the first mounting hole;

a first mounting portion, a first end of the first mounting portion being connected to the second lower housing, a second end of the first mounting portion being provided with a first mounting hole, the first end of the first connecting member being configured for passing through the first mounting hole, and the first connecting member being rotatably connected to the first mounting hole.

11. An electronic device assembly, comprising:

an electronic device; and the charging equipment according to claim 1, wherein the electronic device comprises an induction coil and a battery, and the wireless charging module and the induction coil are in cooperation with each other to charge the battery.

12. A charging equipment, comprising:

a charging bracket, the charging bracket comprising a base and a first supporting portion, and a first magnetic attraction member and a first charging plug being arranged on the first supporting portion;

a mobile power source, the mobile power source comprising a second magnetic attraction member and a second charging plug, wherein the mobile power source is detachably connected to the charging base through a mutual magnetic attraction between the second magnetic attraction member and the first magnetic attraction member, and the second charging plug is configured for electrically connecting to the first charging plug, so that the mobile power source is charged;

wherein the charging bracket further comprises a first rotating shaft assembly, the first rotating shaft assembly is detachably connected to the base, a first end of the first supporting portion is rotatably connected to the first rotating shaft assembly, and a second end of the first supporting portion is a free end;

wherein the charging bracket further comprises a second supporting portion, a second rotating shaft assembly is arranged on the second end of the first supporting portion, and the second supporting portion is rotatably connected to the second end of the first supporting portion via the second rotating shaft assembly;

wherein the first supporting portion comprises:

a first upper housing, the first upper housing being provided with a first mounting position and a first mounting hole, and at least one portion of the first charging plug being configured for extending out from the first mounting hole;

a first lower housing, the first lower housing being provided with a first mounting block, a first side of the first magnetic attraction member being configured for abutting against the first mounting position, and a second side of the first magnetic attraction member being configured for abutting against the first mounting block;

wherein the first rotating shaft assembly comprises:

a first bracket, a first end of the first bracket being detachably connected to the base, a first rotating shaft hole being defined in a second end of the first bracket, a first connecting member, a first end of the first connecting member being configured for passing through the first rotating shaft hole, and the first end of the first connecting member being configured for extending out from the first mounting hole;

a first mounting portion, a first end of the first mounting portion being connected to the second lower housing, a second end of the first mounting portion being provided with a first mounting hole, the first end of the first connecting member being configured for passing through the first mounting hole, and the first connecting member being rotatably connected to the first mounting hole;

wherein the second rotating shaft assembly comprises:

a second mounting portion, the second mounting portion being arranged in the second lower housing, a first end of the second mounting portion being connected to the second lower housing, and a second end of the second mounting portion being provided with a third mounting hole;

a second rotating shaft, an end of the second supporting portion opposite to the second lower housing being provided with a second rotating shaft hole, the first end of the second mounting portion being rotatably connected to the second rotating shaft hole, and the second end of the second mounting portion being rotatably connected to the third mounting hole;

wherein a second bracket is arranged on the mobile power source, and the second bracket is rotatably connected to the mobile power source;

wherein the second bracket comprises:

a third mounting portion, the third mounting portion being detachably connected to the mobile power source, a third supporting portion, a first end of the third supporting portion being rotatably connected to the third mounting portion, and the third supporting portion being a free end.

13. The charging equipment according to claim 12, wherein the mobile power source is provided with at least one first engaging slot, the third mounting portion is provided with at least one first engaging block, and the first engaging block is engaged with the first engaging slot.

14. The charging equipment according to claim 13, wherein the third mounting portion comprises:

a second mounting block, the first engaging block being arranged on the second mounting block, and the second mounting block being further provided with a first avoidance position configured for avoiding the first protrusion and the second protrusion;

a first base plate, the second mounting block being engaged with the first base plate, a third engaging slot being defined in the first base plate, the third engaging slot being configured for penetrating through the first base plate, and the first engaging block being engaged with the third engaging slot;

the first protrusion and the second protrusion are spaced apart and arranged on an end of the first base plate opposite to the third supporting portion.

15. The charging equipment according to claim 12, wherein the mobile power source is provided with at least one second engaging slot, the third supporting portion is provided with at least one second engaging block, and the second engaging block is engaged with the second engaging slot.

16. The charging equipment according to claim 15, wherein the third supporting portion comprises:

a supporting block, the supporting block being provided with a second mounting slot and a second avoidance position configured for avoiding the first protrusion, the second protrusion and the third protrusion, and the second engaging block being arranged on a bottom wall of the second mounting slot;

a second base plate, the second base plate being installed in the second mounting slot, a fourth mounting slot being defined in the second base plate, the fourth mounting slot being configured for penetrating through the second base plate, the second engaging block being engaged with the fourth mounting slot, and the third protrusion being arranged on an end of the second base plate distal from the second mounting slot.

* * * * *